Patented July 22, 1952

2,604,406

UNITED STATES PATENT OFFICE 2,604,406

PROCESS FOR STABILIZING FOODSTUFF AND STABILIZING COMPOSITION

Norman Blihovde, El Monte, Calif., assignor to The Borden Company, New York, N. Y., a corporation of New Jersey No Drawing. Application August 2, 1949, Serial No. 108,225

9 Claims. (Cl. 99—136)

This invention relates to a foodstuff stabilizing agent, and in particular to a stabilizer for ice cream. The invention also relates to correlated improvements in the manufacture and compounding of such stabilizer which are designed to enhance the properties and improve the quality of the food product, especially when used with foodstuffs of the class described.

There has been a need for some time for an improved stabilizer for use in the manufacture of those foods containing a lacteal substance, such as ice cream, chocolate milk, cheese, mayonnaise, salad dressings, and the like, whereby the stabilizer will improve the properties and characteristics of such foods without impairing the flavor or quality. Specific reference will be made herein to such stabilizers as used in the manufacture of ice cream, but it is to be understood that the stabilizer may be advantageously employed in combination with other foodstuffs of the class described.

Heretofore a variety of stabilizing agents have been proposed for use in ice cream in order to add body and to improve the whipping characteristics. Each agent produced different properties and characteristics in the finished product. For example, certain stabilizers such as the natural gums and colloids produced a high degree of whippability in the ice cream mix, but almost invariably the finished product had a short, crumbly body. Other types of stabilizers provided the desired whipping properties for the ice cream mix, but in so doing either produced an icy or coarse effect or a heavy, paste-like body in the finished product. Each stabilizing material, therefore, had its optimum level at which it could be used, which in many instances was far below the desired minimum. Hence, many of the proposed stabilizing agents have, for one reason or another, been found unsatisfactory when placed on the commercial markets.

It was, therefore, a general object of this invention to provide an improved foodstuff stabilizer wherein the disadvantages heretofore encountered in such prior compositions were reduced to a negligible value or entirely overcome.

Another object of this invention was to provide a stabilizer for foodstuffs, wherein there was produced superior emulsifying and whipping properties.

A further object of this invention was to provide a foodstuff stabilizer which produced a smoother and more uniform finished product.

Another object of this invention was to provide an improved stabilizer for use in an ice cream mix, which would enhance the body and whipping characteristics of the mix without impairing the palatability of the finished product.

A still further object of this invention was to provide a foodstuff containing a lacteal substance having combined therewith an improved stabilizer.

Other objects of this invention will in part be obvious and will in part appear hereinafter.

These objects have now been attained by combining the gum extract of Irish moss with a water-soluble edible cellulose ether, whereby there is produced an improved stabilizing agent for foodstuffs of the class described, particularly ice cream, having those desirable properties and characteristics recited hereinabove, including good whippability, enhanced texture, body and melt-down characteristics; and wherein those undesirable properties set forth are reduced to a minimum. The invention is also directed to those processed foodstuffs which contain a lacteal substance as a class, having combined therewith a stabilizing agent comprising a gum extract of Irish moss and a water-soluble edible cellulose ether.

The present invention in its now preferred embodiment is directed to the discovery of a stabilizer for foodstuffs, such as ice cream and the like, which comprises a combination of (a) water-soluble cellulose ether and (b) a water-soluble gum of Irish moss. In the manufacture of ice cream for example, certain stabilizers such as Irish moss gums when used alone do not have many of the features desired to produce the ideal product. As an illustration, when Irish moss gum is used alone as a stabilizer there is a certain amount of crumbliness resulting in the finished product which if could be avoided would make for a more ideal product. By the same token, if a substitute such as sodium carboxy methyl cellulose is employed as the sole ingredient, the final ice cream product has a tendency to whey off. I have discovered, however, that by using a combination of the Irish moss gum and the water-soluble cellulose ether new results are attained which are not realized by employing the ingredients separately and alone. My combination produces a final product which is less crumbly, which has more body, and which does not whey off. The invention accordingly comprises the several steps, and relation of one or more of such steps with respect to each of the others, and the composition possessing the features, properties, and the relation of elements which are exemplified in the following detailed disclosure.

For the water-soluble edible cellulose ether used in preparing the stabilizing agent, there may be employed as a class the edible cellulose ethers which are described in U. S. Patent 2,113,596 to Leon Lilienfeld, granted April 12, 1938. Such cellulose ethers comprise those derivatives of cellulose wherein at least one hydroxyl hydrogen atom in the cellulose molecule is substituted, preferably by an organic radical, to form at least one ether or ether-ester group. For example, among the edible cellulose ethers suitable for forming the stabilizer are the alkyl derivatives such as methyl, ethyl, and propyl derivatives of cellulose, and the like; carboxyalkyl cellulose ethers, such, for example, as carboxymethyl cellulose ethers, carboxyethyl cellulose ethers; and the salts of such carboxyalkyl cellulose ethers, such for example, as the sodium and potassium salts thereof. The cellulose ethers of the class described employed in combination with the gum extract of Irish moss are both non-poisonous and non-toxic.

I have found that a combination of these two ingredients namely, the water-soluble cellulose ether and the gum extract of Irish moss, form a stabilizer which imparts to the aforesaid foodstuff the enhanced properties desired, with a minimum of coarseness or other undesirable properties, which is not enjoyed by either of the two ingredients when used separately. These characteristics are of a magnitude greater than can be accounted for by the additive effects of the components acting independently of each other and can only be explained on the hypothesis that synergy has been established by the individual components acting in unison. In the now preferred embodiment, there is employed in combination with the Irish moss gum extract a sodium salt of carboxymethyl cellulose.

For the gum extract of Irish moss there may be employed that substance which is produced by an aqueous leaching of the crude seaweed, Irish moss. Irish moss is a seaweed which belongs to the biological family known as *Chondrus crispus*, and which contains a mucilaginous, jelly-like substance said to be a colloidal complex consisting chiefly of carrageen.

The extract of Irish moss and the edible cellulose ether of the class described, preferably sodium or potassium carboxymethyl cellulose, are in accordance with my present invention now used in the proportions of 1 part of Irish moss extract and from 1.3 parts of cellulose ether, depending upon the amount of body desired in the foodstuff. If less body is desired in the foodstuff as, for example, the ice cream mix, there is employed a mixture of equal parts of said materials to form the stabilizer, i. e., 1:1 ratio, if more body is desired, 1 part of the aforesaid Irish moss extract may be used in combination with 3 or more parts, for example, up to 12 parts of the cellulose ether to form the stabilizer.

The following examples are given by way of illustration but not by way of limitation. Unless otherwise specified, all parts recited are by weight.

*Example 1*

There was prepared an ice cream mix having the following essential ingredients:

|   | Per cent |
|---|---|
| Butter fat | 10.0 |
| Milk-solids-not-fat | 8.0 |
| Sugar | 15.0 |

There was then added to the ice cream mix 0.13% of the stabilizer of the invention, which was made by pre-mixing equal parts by weight of a gum extract of Irish moss and a water-soluble sodium carboxymethyl cellulose. The ice cream mix was then treated in the usual manner to form a finished ice cream. The product had good whippability and was satisfactory with respect to body.

*Example 2*

To the ice cream composition of Example 1 there was added 0.14% of my stabilizing agent comprising 1 part by weight of a gum extract of Irish moss and 2 parts by water-soluble potassium carboxymethyl cellulose. The ice cream product had slightly greater body than the product of Example 1, while the whippability was about the same.

*Example 3*

To the ice cream composition of Example 1 there was added 0.15% of a stabilizing agent comprising 1 part by weight of a gum extract of Irish moss blended with 3 parts of water-soluble potassium carboxymethyl cellulose. The finished ice cream product had a good whippability and a firm body.

In addition, the ice cream product which results from the incorporation of my stabilizing agent had good texture and enhanced meltdown characteristics. The amount of stabilizer which may be added depends, of course, upon the composition of the mix and the nature of the properties desired in the final product. Various proportions and combinations of the ingredients may be used, as the tastes and preferences of those experienced in the art often differ with the individual. The combination of ingredients may also be varied in different localities to suit local trade demands.

Many different methods for combining the ingredients to form a stabilizer are possible such, for example, as by mixing the Irish moss gum extract in dry or powder form with a cellulose ether in a dry or powder form; or the ingredients may be mixed in liquid media, such as in solution or in emulsion form. Alternatively, one of the ingredients may be dried and then mixed into a liquid which contains the other ingredient.

As a further embodiment, there may be added emulsifiers of the class of polyhydric alcohols reacted with higher fatty acids, such as propylene glyco mono-stearate and the like, so that from 0.1% to 0.2% of such stearate is supplied to the foodstuff, such as ice cream, in addition to the recommended amounts of the stabilizer of my present invention. Such emulsifiers impart body to the ice cream, and which is of more importance retard the development of ice crystals (coarse texture) when the ice cream is stored at ordinary dispensing temperatures. Thus, it is often possible for various reasons to use less amounts of cellulose ether in the mixture by incorporating small amounts of such emulsifiers to stabilize the ice cream mix recited in Example 1. With such ice cream mix it is preferred to use 0.33% of the following formula:

*Formula A*

|   | Per cent |
|---|---|
| Irish moss gum extract | 19.7 |
| Potassium carboxymethyl cellulose | 19.7 |
| Propylene glyco mono-stearate | 60.6 |
| Total | 100.0 |

Correspondingly, as the amount of cellulose ether is increased, the amount of propylene glyco mono-stearate is decreased, as in the following formula:

Formula B

|  | Per cent |
|---|---|
| Irish moss gum extract | 16.0 |
| Potassium carboxymethyl cellulose | 32.2 |
| Propylene glyco mono-stearate | 51.8 |
| Total | 100.0 |

Of this preparation, the optimum amount desirable to stabilize the aforementioned ice cream mix is 0.29%. Of the following preparation, however, recited in Formula C, the optimum amount necessary to stabilize the aforementioned ice cream mix is 0.25%:

Formula C

|  | Per cent |
|---|---|
| Irish moss gum extract | 15.0 |
| Potassium carboxymethyl cellulose | 45.0 |
| Propylene glyco mono-stearate | 40.0 |
| Total | 100.0 |

It will thus be seen from the foregoing compositions that various modifications may be adopted with proportionate relationships of the various stabilizing agents to effect the desired results in ice creams, but it will be found that equally satisfactory results are attained when my stabilizer is used in similar or analogous proportions in connection with the other foodstuffs of the class described.

It is also to be understood that the following claims are intended to cover all of the generic and specific features of the invention herein described, and all statements of the scope of the invention which, as a matter of language, might be said to fall therebetween. This is a continuation-in-part of my copending patent application, U. S. Serial No. 648,556, filed February 18, 1946 now abandoned.

Having described my invention, what I claim as new and desire to secure by Letters Patent is:

1. A stabilizer for ice cream comprising the combination of an edible, non-toxic, water-soluble cellulose ether and the water-soluble gum of Irish moss, the cellulose ether being present in the proportion of 1 to 12 parts by weight for 1 part of the Irish moss.

2. A stabilizer for ice cream comprising the combination of an edible, non-toxic, water-soluble cellulose ether and the water-soluble gum of Irish moss, the cellulose ether being present in the proportion of 1–3 parts by weight for 1 of the Irish moss.

3. A stabilizer for ice cream comprising the combination of an edible, non-toxic, water-soluble cellulose ether and the water-soluble gum of Irish moss, the cellulose ether being present in the form of the salt of the said ether with a metal selected from the group consisting of sodium and potassium, and the cellulose ether salt being present in the combination in the proportion of 1 to 12 parts by weight for 1 part of the Irish moss.

4. A stabilizer for ice cream comprising the combination of an edible, non-toxic water-soluble cellulose ether, propylene stearate and the water-soluble gum of Irish moss, the cellulose ether being present in the proportion of 1 to 12 parts by weight for 1 part of the Irish moss.

5. The ice cream stabilizer of claim 1, the cellulose ether being a salt of carboxy methyl cellulose with a metal selected from the group consisting of sodium and potassium.

6. Ice cream comprising cream, milk, sugar, and, as a stabilizer therefor, a relatively small quantity of a mixture composed of an edible, non-toxic water-soluble cellulose ether and the water-soluble gum of Irish moss, the cellulose ether being present in the stabilizer in the proportion of 1 to 12 parts by weight for 1 part of Irish moss.

7. Ice cream comprising cream, milk, sugar, and, as a stabilizer therefor, the combination of an edible, non-toxic, water-soluble cellulose ether and the water-soluble gum of Irish moss in the proportion of about 0.13 part of the stabilizer for 100 parts of the ice cream.

8. An ice cream mix stabilized by the presence of a relatively small quantity of a mixture composed of sodium carboxy-methyl-cellulose and Irish moss, said mixture constituting about 0.13 to 0.15% of the ice cream mix.

9. Ice cream as specified in claim 6 in which the cellulose ether is present in the stabilizer in the proportion of 1 to 3 parts by weight for 1 part of Irish moss.

NORMAN BLIHOVDE.

REFERENCES CITED

The following references are of record in the file of this patent:

UNITED STATES PATENTS

| Number | Name | Date |
|---|---|---|
| 1,946,649 | Thomas et al. | Feb. 13, 1934 |
| 2,011,594 | Seltzer | Aug. 20, 1935 |
| 2,036,922 | Clark et al. | Apr. 7, 1936 |
| 2,036,934 | Green | Apr. 7, 1936 |
| 2,395,060 | Musher | Feb. 19, 1946 |
| 2,395,061 | Musher | Feb. 19, 1946 |
| 2,403,547 | Peschardt | July 9, 1946 |
| 2,423,600 | Landers | July 8, 1947 |